United States Patent [19]

Snodgrass et al.

[11] 3,983,981
[45] Oct. 5, 1976

[54] VISCOUS FLUID CLUTCH

[75] Inventors: John N. Snodgrass, Miamisburg;
Joseph P. Pendergast, Bellbrook, both of Ohio

[73] Assignee: General Motors Corporation, Detroit, Mich.

[22] Filed: June 9, 1975

[21] Appl. No.: 585,137

[52] U.S. Cl. ............................ 192/58 B; 192/82 T; 192/113 B
[51] Int. Cl.² .................. F16D 35/00; F16D 43/25
[58] Field of Search ............. 192/58 B, 82 T, 113 B

[56] References Cited
UNITED STATES PATENTS

| | | | |
|---|---|---|---|
| 3,536,175 | 10/1970 | Kawabe et al. | 192/58 B |
| 3,809,197 | 5/1974 | Clancey | 192/58 B |
| 3,865,221 | 2/1975 | Coty | 192/58 B |
| 3,899,059 | 8/1975 | Leichliter | 192/58 B |

Primary Examiner—Allan D. Herrmann
Attorney, Agent, or Firm—John P. Moran

[57] ABSTRACT

A viscous fluid clutch wherein a fluid medium functions in response to ambient temperature changes to transmit torque between relatively rotatable input and output members by variably filling a predetermined shear space therebetween with a viscous fluid medium, the shear space consisting of interdigitated concentric annular grooves formed on adjacent faces of the input and output members, each groove being approximately 0.060 inch wide and 0.270 inch deep, with the lands separating adjacent grooves being approximately 0.040 inch wide, and the fluid medium used in conjunction therewith having a viscosity of approximately 3,000 centistokes, the combination producing improved results with respect to inhibiting boiling of the radiator coolant and prolonging fluid medium operational life.

5 Claims, 4 Drawing Figures

VISCOUS FLUID CLUTCH

This invention relates generally to variable speed drive devices and, more particularly, to a viscous fluid clutch adapted to drive a cooling fan for an internal combustion engine.

Cooling fans in use with automotive internal combustion engines today generally include either flexible blades, whose pitch varies with speed, or rigid blades normally mounted on a viscous fluid-filled, shear-drive clutch, wherein a fluid medium functions in response to ambient temperature changes to transmit torque between relatively rotatable input and output members by variably filling a predetermined shear space therebetween with a suitable fluid medium. The range is from a completely full, or so-called engaged mode condition, to a substantially empty, or disengaged mode condition.

It is important, upon returning to an idle condition after a heavy-load driving operation, with the clutch in the engaged mode due to a high ambient temperature, that the coolant in the radiator not reach a boil within a predetermined minimum length of time. It is also important, while the engine is cold, soon after start-up, for example, with the clutch in a disengaged mode, that there be as high a fan speed as possible. This serves to prevent the engine from becoming overheated, and is believed to prevent a detrimental build-up of pressure of the fluid in an air conditioner when one is present.

It has been determined that by incorporating in the viscous fluid clutch housing and, correspondingly, in the clutch plate mounted in the housing, a plurality of concentric grooves which are substantially wider and deeper than has heretofore been accepted practice, in conjunction with a substantially lower-viscosity silicone fluid, the above desirable features are attained, along with the added advantage that the resultant larger overall shear-drive area serves to better dissipate the heat of the fluid medium, thereby prolonging its operational life.

Accordingly, an object of the invention is to provide an improved viscous fluid clutch wherein the above-described characteristics are achieved.

Another object of the invention is to provide an improved viscous fluid clutch wherein the area of the shear-drive space is increased and the viscosity of the viscous fluid medium is decreased in a manner to substantially improve radiator coolant boil characteristics, particularly during idle conditions after a heavy-load driving operation, with the clutch in the engaged mode due to a high ambient temperature.

A further object of the invention is to provide an improved viscous fluid clutch wherein the interdigitated annular grooves formed on adjacent faces of relatively rotatable drive members are substantially wider and deeper than has heretofore been accepted practice, and the viscous fluid medium used in conjunction therewith is substantially lower in viscosity than has heretofore been accepted practice, the combination serving to retard boiling of the radiator coolant during all phases of idle and low engine rpm conditions.

Still another object of the invention is to provide such a viscous fluid clutch including a housing rotatably mounted by bearings on a central shaft and having an annular working chamber formed therein, a clutch plate enclosed by the housing in the working chamber and having a hub secured to the central shaft with the remainder of the clutch plate extending substantially radially outwardly from the hub, a plurality of approximately 0.060 inch-wide and 0.270 inch-deep annular concentric grooves formed in the housing, the lands between adjacent grooves being approximately 0.040 inch wide, and a plurality of approximately 0.060 inch-wide and 0.270 inch-deep annular concentric grooves formed in the clutch plate, the lands between adjacent grooves being approximately 0.040 inch wide, the lands of the housing extending into the respective annular concentric grooves of the clutch plate, and the lands of the clutch plate extending into the respective annular concentric grooves of the housing to form a predetermined shear space therebetween and operable with a fluid medium having a viscosity of 3,000 centistokes or less to provide a shear-type fluid drive between the housing and the clutch plate, the combination of the resultant greater shear-drive area and reduced change in apparent viscosity of the fluid medium providing a means for retarding boiling of the radiator coolant during idle and low engine rpm conditions, particularly after heavy-load driving conditions.

A still further object of the invention is to provide such a viscous fluid clutch wherein the greater housing area to which the fluid medium is subjected, resulting from the deeper annular grooves formed in the clutch housing, serves to provide the additional advantage of more efficiently dissipating heat from the fluid medium, through the housing wall, to the atmosphere, and the wider shear area between the outer peripheral surface of the clutch plate and the adjacent inner peripheral surface of the working chamber, resulting from the additional clutch plate width required for the formation of the deeper annular grooves in the clutch plate, serves to cause the fan to rotate faster during the so-called disengaged mode, since the fluid medium is always present radially outwardly of the outlet port leading from the working chamber to the reservoir chamber, such faster, disengaged mode, fan speed being recognized by those skilled in the art as a desirable feature.

These and other objects and advantages of the invention will become apparent when reference is made to the following description and accompanying drawings wherein.

Figure 1:
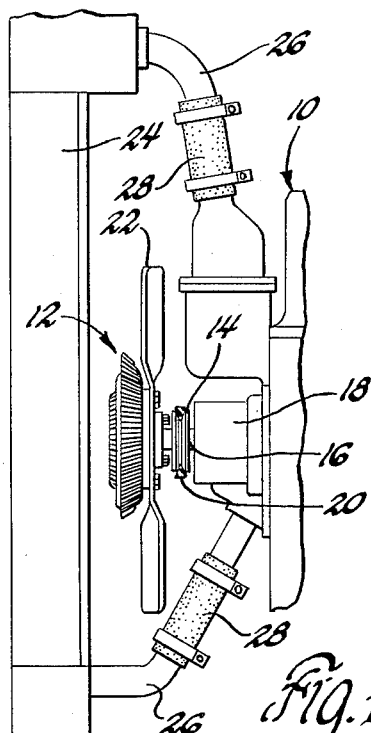
FIG. 1 is a fragmentary side elevational view of a radiator and engine having a viscous fluid clutch-driven cooling fan associated therewith.
Figure 3:
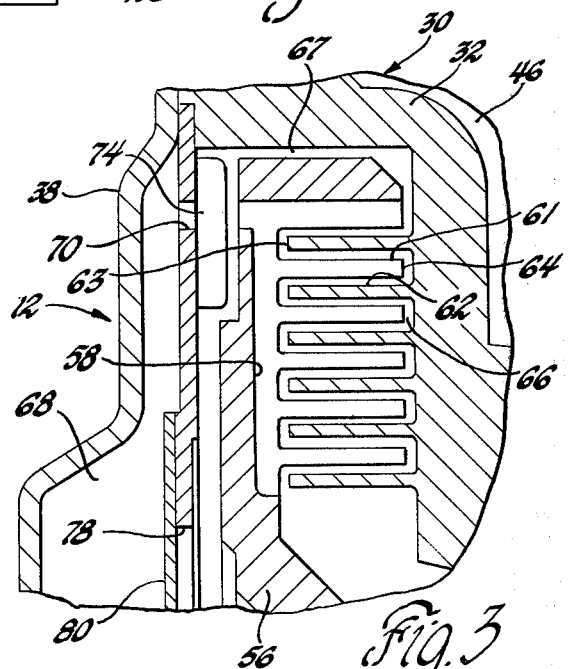
FIG. 3 is an enlarged fragmentary cross-sectional view of a portion of the FIG. 2 structure.

Referring to the drawings in greater detail, FIG. 1 illustrates an engine 10 having a viscous fluid clutch 12 and a pulley 14 mounted on a drive shaft 16 extending from the conventional water pump 18, the pulley 14 being rotated by a V-belt 20 connected to the crankshaft [not shown] for driving a cooling fan 22 secured to the clutch 12. The fluid clutch 12 and the cooling fan 22 are located between the engine 10 and a radiator 24. The usual conduits 26 and hoses 28 communicate between radiator 24 and the engine 10 adjacent the water pump 18.

Figure 2:
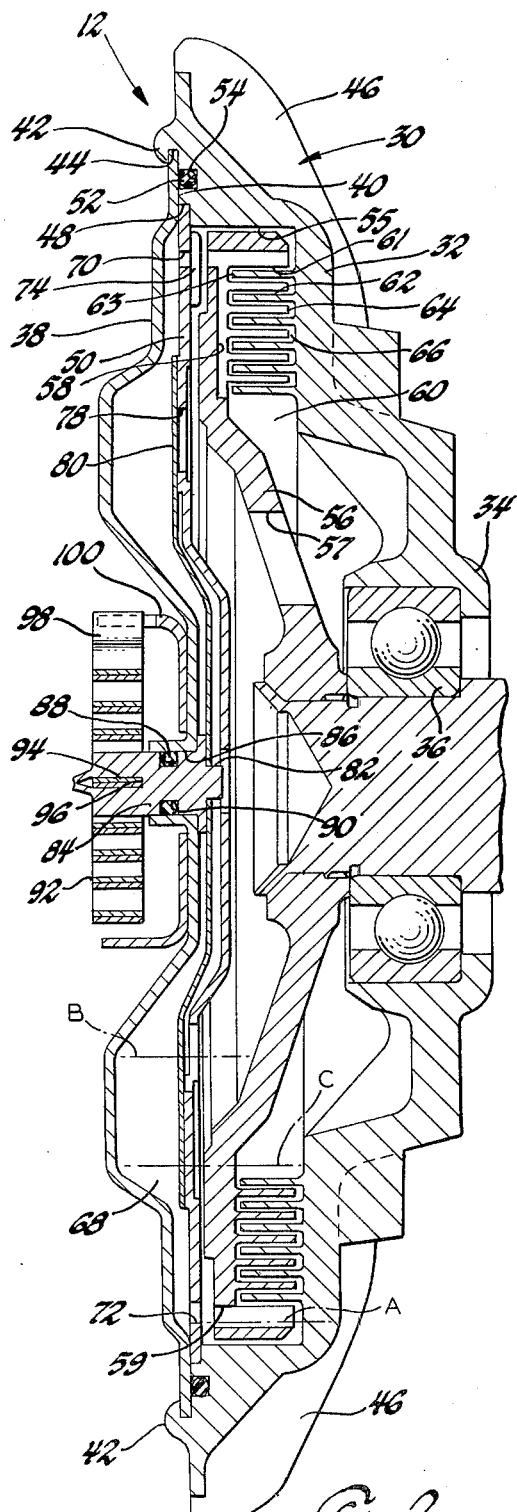
FIG. 2 is an enlarged cross-sectional view of a viscous fluid, shear-type clutch embodying the invention.

Referring now to FIG. 2, the fluid clutch 12 includes a housing 30 which includes a rear wall 32 having a hub 34 which is rotatably mounted by a suitable bearing 36 on the drive shaft 16. The housing 30 further includes a cover member or front wall 38 which has an annular flat surface 40 formed adjacent its peripheral edge, the latter being confined by an annular lip 42 in an annular recess 44 formed in the housing 30. Cooling fins 46 are formed on the outer surface of the rear wall 32. A second annular recess 48 is formed radially inward of the outer periphery of the annular recess 44. A divider wall 50 is confined adjacent its outer edge in the recess 48 by the cover member 38. A seal 52 is compressed in an annular groove 54 formed in the rear wall 32 intermediate the outer edges of the annular recesses 44 and 48. A third annular deeper recess 55 is formed in the rear wall 32 radially inward of the second annular recess 48. A clutch plate 56 having equispaced openings 57 and radial V-grooves 58 formed therein, the latter terminating in ports 59, is secured at its center by any suitable means to the drive shaft 16, the outer peripheral portion thereof being freely located in an operating or working chamber 60 formed by the third annular recess 55.

Adjacent portions of the clutch plate 56 and the rear wall 32 are provided with torque-transmitting elements consisting of annular grooves 61 and 62, respectively, with the respective lands 63 and 64 therebetween cooperatively interdigitated with the adjacent grooves 62 and 61, respectively, resulting in the formation of an intervening fluid shear space 66 therebetween to accommodate a viscous fluid as a torque-transmitting medium.

Each of the grooves 61 and 62 are formed approximately 0.060 inch or 1.524 millimeters wide and 0.270 inch or 6.859 millimeters deep, and spaced such that each of the lands 63 and 64 therebetween is approximately 0.040 inch or 1.018 millimeters wide. The fluid medium used in conjunction with the resultant shear space 66 has a viscosity of 3,000 centistokes or less.

It is known that in operation the viscosity of the fluid medium reduces to a progressively lower apparent viscosity with increased shear rate, i.e., the ratio of relative velocity of two adjacent relatively rotatable drive members to the shear space thickness therebetween. It is also known that the higher viscosity fluid undergoes a greater change in apparent viscosity than a lower viscosity fluid. Hence, tests have indicated that the combination of the lower viscosity fluid medium and the greater shear-drive area resulting from the wider and deeper grooves 61 and 62 produces an overall higher fan 22 speed during the engaged mode, particularly after returning to an idle condition after undergoing a heavy-load driving operation, with high ambient temperatures present, thereby assuring that the coolant in the radiator not reach a boil within a predetermined length of time. As indicated above, an additional desirable feature of the wider and deeper grooves 62 condition is that the resultant larger overall shear-drive area along the inner surface of the rear wall 32 of the housing 30 serves to better dissipate the heat from the fluid medium, thereby prolonging the operational life thereof.

Still another desirable feature of the deeper grooves 61 condition stems from the fact that the clutch plate 56 is generally wider in order to accommodate the greater depth of the grooves 61. Correspondingly, the working chamber 60 must be wider to accommodate the wider clutch plate 56. Hence, it is apparent that the resultant wider fluid shear space 67 intermediate the outer peripheral surface of the clutch plate 56 and the inner peripheral surface of the working chamber 60 will accommodate a greater volume of the fluid medium. As will be seen below, the peripheral shear space 67 remains full at all times, including the period of the disengaged mode. Thus, during such disengaged mode, inasmuch as there is more fluid operative between the relatively rotatable drive members 30 and 56, than is generally the case, the housing member 30 will be driven at a higher speed relative to the speed of the clutch plate driving member 56, thus better serving to prevent the engine from becoming overheated, as well as to prevent a detrimental build-up of pressure of the fluid in an air conditioner when one is present.

It may be noted in FIG. 2 that the front wall or cover member 38 includes an annular bend intermediate the centers and peripheral edges thereof which forms an annular reservoir 68 with the divider wall 50. Pump outlet openings 70 and/or 72 are formed through the divider wall 50, each adjacent a pump or dam element 74 formed on the divider wall 50, the openings 70 and 72 communicating between the working chamber 60 and the annular reservoir 68. The pump elements 74 may consist of a circular boss formed on the divider wall 50 by any suitable means, such as stamping, or it may be a rectangular-shaped or other-shaped member secured to the divider wall 50, such as by welding. It is to be understood that, in some applications, one outlet and one pump element may be sufficient, while other applications may require two such pumping arrangements.

One or more inlet ports 78 are also formed in the divider wall 50, communicating between the annular reservoir 68 and the working chamber 60 radially inward of the pump elements 74 and the pump outlet openings 70/72. The inlet port 78 is at times closed off by a valve member 80. The valve member 80 is secured in any suitable manner to a reduced diameter portion 82 of a center pin of shaft 84, which is rotatably mounted in a central opening 86 formed in the front wall or cover member 38. A seal ring 88 may be mounted in an annular groove 90 formed in the pin 84 within the central opening 86 to prevent leakage therepast. A helically wound, bimetallic thermostatic valve control element 92 is provided with an inwardly extending end portion 94 which is mounted in a transverse slot 96 formed in the pin 84. An outwardly extending end portion 98 of the bimetallic element 92 is secured to a post 100. With this arrangement, a change in ambient temperature either winds or unwinds the bimetallic element 92, resulting in rotation of the pin 84 and the valve member 80.

OPERATION

So long as the vehicle engine 10 (FIG. 1) is in operation, the drive shaft 16 and the associated clutch plate 56 (FIG. 2) will be driven by the pulley 14 operatively connected via the belt 20 to the crankshaft [not shown] at an appropriate speed ratio with respect to engine speed. The initial position of the temperature-responsive valve member 80 will be closed across the inlet port 78 in the divider wall 50, and will remain closed so long as the engine is cold, thus preventing any flow of fluid from the annular reservoir 68 into the working chamber 60. Since at least one pump outlet opening 70 is always open, providing continuous communication between the working chamber 60 and the annular reservoir 68, fluid from the working chamber 60 will be pumped therethrough by virtue of the pump elements 74 serving as dams or wipers, forcing the fluid to flow into the respective pump outlet openings 70 and, thence, into the annular reservoir 68. A continual supply of fluid is made available to the wiper elements 74 by virtue of the openings 57 formed in the clutch plate 56. The openings 57 are fed by fluid from the radial V-grooves 58 under the action of centrifugal force and the effect of suction created by the pumping action of the elements 74 and the outlets 70.

The total volume of fluid is such that when the working chamber 60 is substantially empty, i.e., at a level designated by broken line A, FIG. 2, at the outermost edge of the openings 57, the fluid in the annular reservoir 68 will be held under the action of centrifugal force in the outer annular portion of the reservoir 68 with an inner annular liquid level B, FIG. 2, the head resulting from the fluid height B to A being off-set by the force generated by the pumping action of the pump elements 74 on the fluid remaining in the working chamber 60, to prevent any flow-back through the outlet openings 70. Under this condition, commonly known and indicated above as the disengaged mode, the slip between the clutch plate 56 and the housing 30 is greatest, and fan speed is correspondingly low, as represented by the curve D in FIG. 4.

As the ambient temperature increases due to the warm-up of the radiator and engine, the bimetallic thermostatic valve control element 92 will begin to wind up and, since it is restrained at its outer end 98 by the post 100, its inner end 94 will rotate the cooperatively connected pin 84 and the valve member 80, progressively uncovering the inlet ports 78, as will be described. As a result, fluid will flow through the inlet ports 78 back into the working chamber 60, generally progressively increasing the volume therein with increasing temperature. More specifically, as the fluid is admitted through the inlet ports 78 by the temperature-controlled valve element 80, it will first be projected radially outwardly between the divider wall 50 and the adjacent face of the clutch plate 56. It is believed to begin to fill the peripheral shear space between the outer edge of the clutch plate 56 and the wall of the annular recess 55, while filling radially inwardly between the wall 50 and the adjacent face of the plate 56. Once the fluid attains a level radially within the outer edge of the openings 57 formed in the clutch plate 56, it will spill through the openings 57 into the shear space 66.

Figure 4:
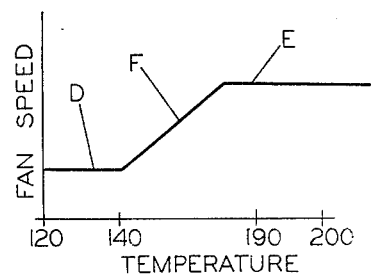
FIG. 4 is a graph illustrating operational characteristics of the invention.

Throughout the above, the volume of flow through the continually open outlet ports 70 remains substantially constant, being influenced by the rotary speed of the clutch plate 56, and the working chamber 60 is filled in the manner just described until the inner annular levels in both the working chamber 60 and the annular reservoir 68 are at the level designated by C, after which the fan speed will remain at its highest constant speed, as represented by the corresponding curve E of FIG. 4.

It is apparent that, as the viscous fluid is admitted to the working chamber 60 with increased temperature, filling the fluid shear space 66 between the oppositely disposed interdigitated groove elements 61 and 62, the shear-type fluid drive therebetween will be influenced, and slip speed, or the difference between the speed of the clutch plate 56 and that of the housing 30 will decrease, with the fan speed progressively increasing, as indicated by curve F in FIG. 4. So long as the inlet ports 78 remain open, a fluid circulation process will prevail, i.e., the rotating pump or dam elements 74 will continue to promote the flow of fluid from the working chamber 60 through the pump outlet openings 70/72 to the annular reservoir 68 from whence it will continually return to the working chamber 60 via the variably opening inlet ports 78.

As indicated, when the cooling requirements are at a maximum, the temperature-responsive valve member 80 will have rotated completely past the inlet openings 78, permitting the fluid in the chamber 60 and the reservoir 68 to reach a point of equilibrium, i.e., liquid level C in FIG. 2, causing the relatively rotatable drive members 56 and 30 to operate at minimum slip speed and thereby effecting a maximum cooling function, inasmuch as the fan 22 is secured to the outer portion of the rear wall 32 of the housing 30 (FIG. 1),. So long as the inlet ports 78 remain fully open, the circulation process described above will maintain the level C illustrated in FIG. 2.

It should be apparent that the invention provides simplified, efficient, and economical means for producing improved cooling characteristics at idle and low engine rpms during the engaged mode, higher fan speeds during the disengaged mode, and prolonged fluid medium operational life.

While but one embodiment of the invention has been shown and described, other modifications thereof are possible.

We claim:

1. In a system for cooling an internal combustion engine wherein cooling of the engine is accomplished by a viscous fluid clutch-driven cooling fan, the clutch being of the type having relatively rotating clutch plate and clutch housing members, the clutch housing member defining a working chamber having a fluid shear-drive space bounded by interdigitated annular elements formed in the clutch plate and clutch housing members, respectively, an improvement characterized by grooves in the order of 0.060 inch wide and 0.270 inch deep forming the interdigitated annular elements, with lands separating adjacent grooves being in the order of 0.040 inch wide, and a fluid medium in the shear-drive space having a viscosity of 3,000 centistokes or less, the combination of the relatively greater shear-drive area and the reduced change in apparent operational viscosity of the fluid medium providing a means for retarding boiling of the radiator coolant during idle and low engine rpm conditions, particularly after heavy-load driving conditions.

2. A fluid coupling comprising a housing rotatably mounted on a central shaft and having an annular working chamber formed therein, a clutch plate enclosed by said housing in said working chamber and having a hub secured to said central shaft with the remainder of said clutch plate extending substantially radially outwardly from said hub, a plurality of approximately 0.060 inch wide and 0.270 inch deep annular concentric grooves formed in said housing, the lands between adjacent grooves being approximately 0.040 inch wide, and a plurality of approximately 0.060 inch wide and 0.270 inch deep annular concentric grooves formed in said clutch plate, the lands between adjacent grooves being approximately 0.040 inch wide, said lands of said housing extending into said respective annular concentric grooves of said clutch plate and said lands of said clutch plate extending into said respective annular concentric grooves of said housing to form a predetermined shear space therebetween and operable with a low-viscosity fluid medium to provide a shear-type fluid drive between said housing and said clutch plate, the combination of the resultant relatively greater shear-drive area and reduced change in apparent operational viscosity of the fluid medium providing a means for retarding boiling of the radiator coolant during idle and low engine rpm conditions, particularly after heavy-load driving conditions.

3. In a system for cooling an internal combustion engine wherein cooling of the engine is accomplished by a viscous fluid clutch-driven cooling fan, the clutch being of the type having relatively rotating clutch plate and clutch housing members, the clutch housing member defining a working chamber having a fluid shear-drive space bounded by interdigitated annular elements formed in the clutch plate and clutch housing members, respectively, an improvement characterized by grooves in the order of 0.060 inch wide and 0.270 inch deep forming the interdigitated annular elements, with lands separating adjacent grooves being in the order of 0.040 inch wide, and a fluid medium in the shear-drive space having a viscosity of 3,000 centistokes or less, the combination of the relatively greater shear-drive area and the reduced change in apparent operational viscosity of the fluid medium providing a means for retarding boiling of the radiator coolant during idle and low engine rpm conditions, particularly after heavy-load driving conditions; the greater clutch housing member area to which the fluid medium is subjected, resulting from the relatively deeper annular grooves formed in the clutch housing member, serving to provide the additional advantage of more efficiently dissipating heat from the fluid medium through the housing wall to the atmosphere, thereby prolonging the fluid medium operational life.

4. In a system for cooling an internal combustion engine wherein cooling of the engine is accomplished by a viscous fluid clutch-driven cooling fan, the clutch being of the type having relatively rotating clutch plate and clutch housing members, the clutch housing member defining a working chamber having a first fluid shear-drive space bounded by interdigitated annular elements formed in the driving and driven members, respectively, and wherein the clutch plate and clutch housing members have closely adjacent cylindrical peripheral surfaces outboard the annular elements forming a second shear-drive space within which the fluid medium is constantly present, an improvement characterized by grooves in the order of 0.060 inch wide and 0.270 inch deep forming the interdigitated annular elements, with lands separating adjacent grooves being in the order of 0.040 inch wide, and a fluid medium in the shear-drive spaces having a viscosity of 3,000 centistokes or less, the combination of the relatively greater shear-drive areas and the relatively higher apparent operational viscosity of the fluid medium resulting in improved cooling characteristics at idle and low engine rpms during the engaged mode; and the second shear-drive space between the outer peripheral surface of the clutch plate member and the adjacent inner peripheral surface of the clutch housing member accommodating additional fluid medium as a result of the additional clutch plate width required for the formation of the relatively deeper annular grooves in the clutch plate member, thereby serving to cause the fan to rotate faster during the disengaged mode.

5. In a system for cooling an internal combustion engine wherein cooling of the engine is accomplished by a viscous fluid clutch-driven cooling fan, the clutch being of the type having relatively rotating clutch plate and clutch housing members, the clutch housing member defining a working chamber having a first fluid shear-drive space bounded by interdigitated annular elements formed in the driving and driven members, respectively, and wherein the clutch plate and clutch housing members have closely adjacent cylindrical peripheral surfaces outboard the annular elements forming a second shear-drive space within which the fluid medium is constantly present, an improvement characterized by relatively deeper annular grooves in the order of 0.060 inch wide and 0.270 inch deep forming the interdigitated annular elements, with lands separating adjacent grooves being in the order of 0.040 inch wide, and a fluid medium in the shear-drive spaces having a viscosity of 3,000 centistokes or less, the combination of the relatively greater shear-drive areas and the relatively higher apparent operational viscosity of the fluid medium resulting in improved cooling characteristics at idle and low engine rpms during the engaged mode; the second shear-drive space between the outer peripheral surface of the clutch plate member and the adjacent inner peripheral surface of the clutch housing member accommodating a relatively greater volume of fluid medium as a result of the additional clutch plate width required for the formation of the relatively deeper annular grooves in the clutch plate member, such relatively greater volume of fluid medium serving to cause the fan to rotate relatively faster during the disengaged mode; and the greater clutch housing member area to which the fluid medium is subjected, resulting from the relatively deeper annular grooves formed in the clutch housing member, serving to more efficiently dissipate heat from the fluid medium through the housing wall to the atmosphere, thereby prolonging the fluid medium operational life.

* * * * *